(12) United States Patent
Foth et al.

(10) Patent No.: US 7,647,278 B1
(45) Date of Patent: Jan. 12, 2010

(54) METHOD FOR FACILITATING A TRANSACTION BETWEEN A MERCHANT AND A BUYER

(75) Inventors: Thomas J. Foth, Trumbull, CT (US); Brian M. Romansky, Monroe, CT (US)

(73) Assignee: Pitney Bowes Inc., Stamford, CT (US)

( * ) Notice: Subject to any disclaimer, the term of this patent is extended or adjusted under 35 U.S.C. 154(b) by 1387 days.

(21) Appl. No.: 09/474,326

(22) Filed: Dec. 29, 1999

(51) Int. Cl.
*G06F 21/00* (2006.01)

(52) U.S. Cl. .............................. 705/59; 705/64; 705/69; 705/35; 705/1; 705/39; 713/201; 713/170; 713/168; 380/270; 380/283

(58) Field of Classification Search .................... 705/59
See application file for complete search history.

(56) References Cited

U.S. PATENT DOCUMENTS

| | | | |
|---|---|---|---|
| 5,191,611 A * | 3/1993 | Lang ............................ 705/53 |
| 5,509,070 A | 4/1996 | Schull |
| 5,590,197 A | 12/1996 | Chen et al. ..................... 380/24 |
| 5,692,049 A * | 11/1997 | Johnson et al. .............. 713/189 |
| 5,708,709 A * | 1/1998 | Rose ............................ 380/30 |
| 5,845,281 A | 12/1998 | Benson et al. |
| 5,855,008 A | 12/1998 | Goldhaber et al. ............ 705/14 |
| 5,883,810 A | 3/1999 | Franklin et al. ........ 364/479.02 |
| 5,889,860 A * | 3/1999 | Eller et al. ..................... 705/26 |
| 5,907,617 A | 5/1999 | Ronning ........................ 380/4 |
| 5,933,498 A | 8/1999 | Schneck et al. |
| 5,937,164 A * | 8/1999 | Mages et al. ................. 380/279 |
| 5,956,400 A | 9/1999 | Chaum et al. .................. 380/4 |
| 5,999,629 A * | 12/1999 | Heer et al. ..................... 705/51 |
| 6,005,939 A | 12/1999 | Fortenberry et al. .......... 380/21 |
| 6,016,348 A * | 1/2000 | Blatter et al. ............... 380/216 |
| 6,055,518 A | 4/2000 | Franklin et al. ............... 705/37 |
| 6,061,451 A * | 5/2000 | Muratani et al. ............. 380/201 |
| 6,073,124 A * | 6/2000 | Krishnan et al. .............. 705/59 |
| 6,076,077 A * | 6/2000 | Saito ........................... 705/51 |

(Continued)

FOREIGN PATENT DOCUMENTS

CA 2301581 8/1998

(Continued)

OTHER PUBLICATIONS

Todd Woody: Fight for your rights The Standard (Internet), Jun. 7, 1999, XP002153035 Retrieved from the Internet: URL:http://thestandard.com/article/display/0,_1151,_4793,00.html 'retrieved on Nov. 16, 2000.

(Continued)

*Primary Examiner*—Andrew J. Fischer
*Assistant Examiner*—Mamon Obeid
(74) *Attorney, Agent, or Firm*—Steven J. Shapiro; Angelo N. Chaclas

(57) ABSTRACT

A method includes inputting into the computer a digital content file of the merchant, the digital content file including a header with information related to purchasing a digital content product and the digital content product in encoded form. The computer reads the downloaded header and displays at least some of the information related to purchasing the digital content product while concurrently downloading the encoded digital content product into the computer.

4 Claims, 7 Drawing Sheets

U.S. PATENT DOCUMENTS

| | | | | |
|---|---|---|---|---|
| 6,078,902 | A | 6/2000 | Schenkler | 705/35 |
| 6,141,652 | A * | 10/2000 | Reeder | 705/400 |
| 6,226,618 | B1 * | 5/2001 | Downs et al. | 380/279 |
| 6,233,567 | B1 * | 5/2001 | Cohen | 705/59 |
| 6,473,740 | B2 | 10/2002 | Cockrill et al. | |
| 6,473,860 | B1 * | 10/2002 | Chan | 713/193 |
| 2001/0039659 | A1 * | 11/2001 | Simmons et al. | 725/61 |

FOREIGN PATENT DOCUMENTS

| | | |
|---|---|---|
| EP | 0 798 892 | 10/1997 |

OTHER PUBLICATIONS

Choudhury A K et al: "Copyright Protection for Electronic Publishing Over Computer Networks"—IEEE Network, IEEE Inc. NY, US vol. 9, No. 3, May 1, 1995 pp. 12-20, XP000505280 ISSN: 0890-8044.

Baker: "In the money—Qpass has big hopes for small Net sales" Business Journal (Internet), Oct. 12, 1998, XP002134402 Retrieved from the Internet: URL:www.amcity.com/seattle/stories/1998/10/12/story3.html 'retrieved on Mar. 30, 2000.

* cited by examiner

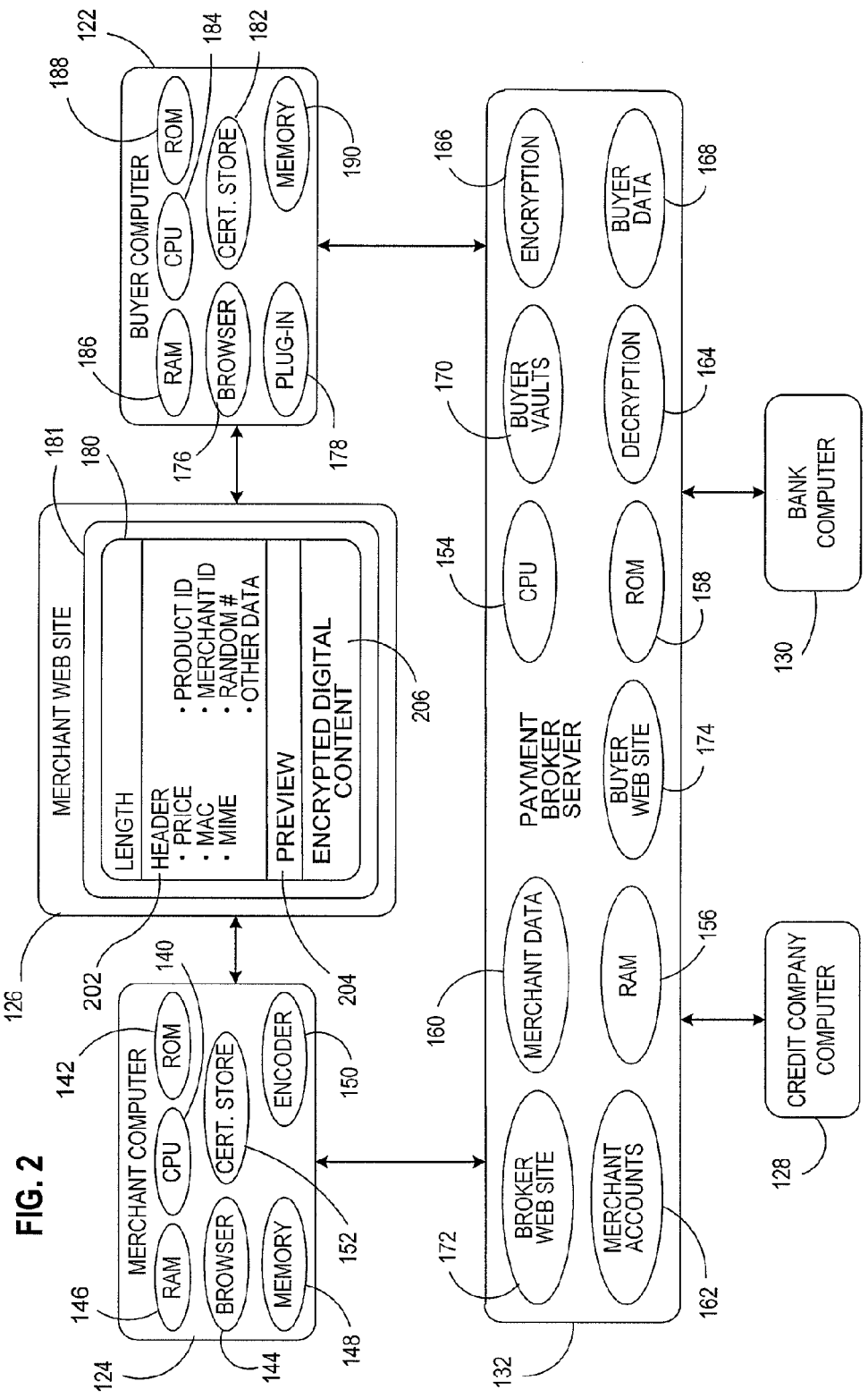

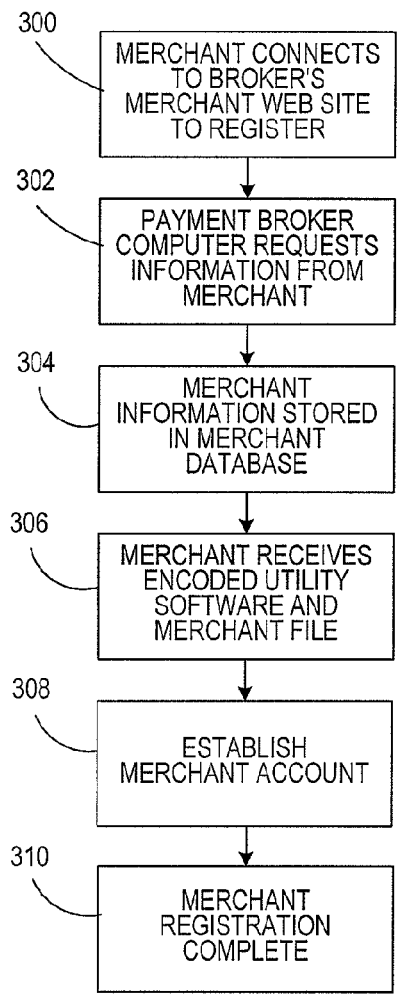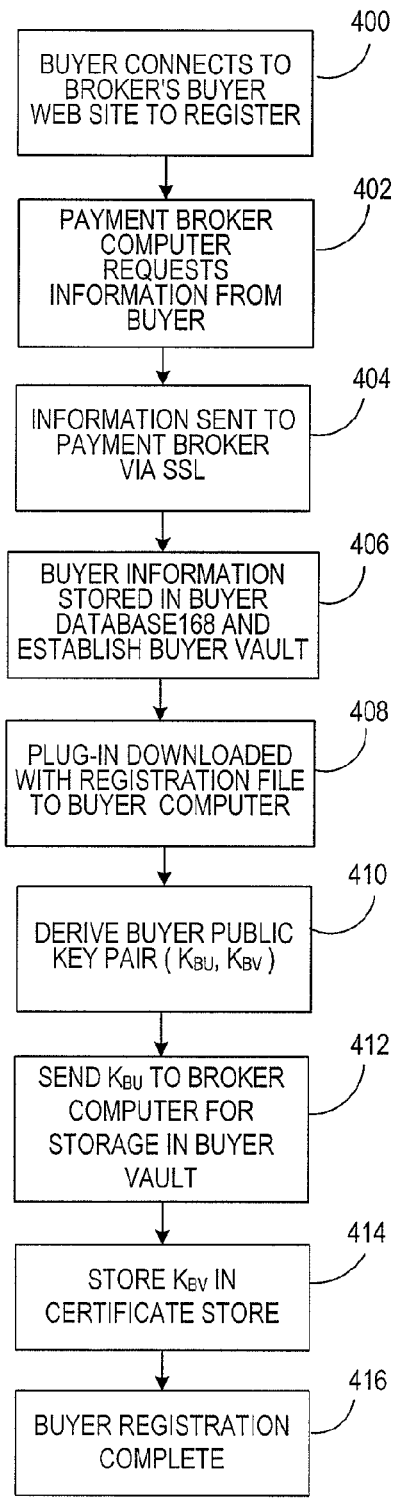

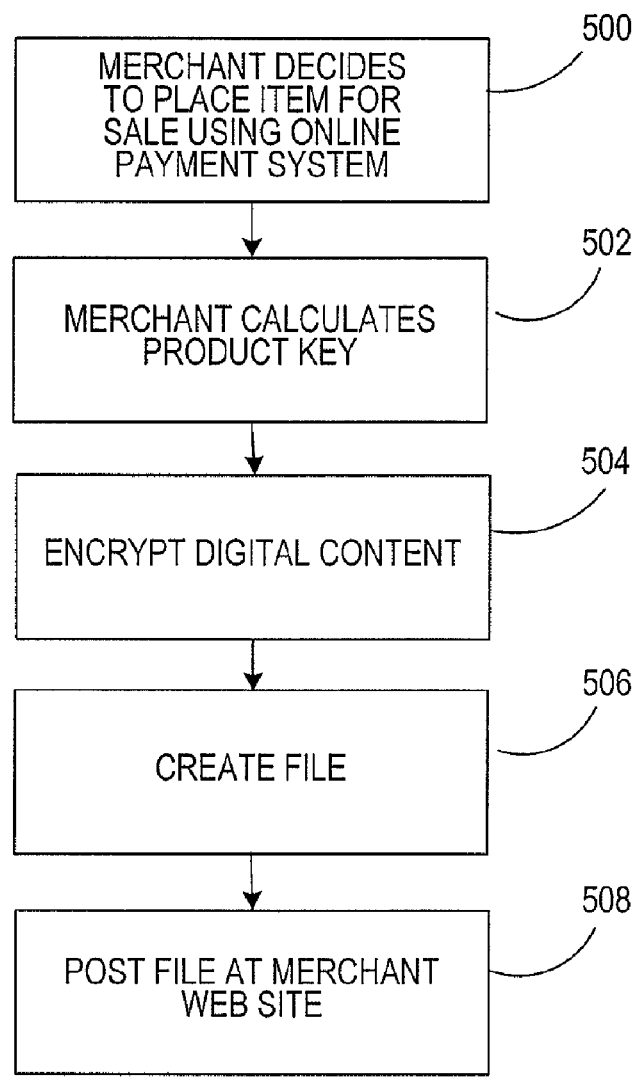

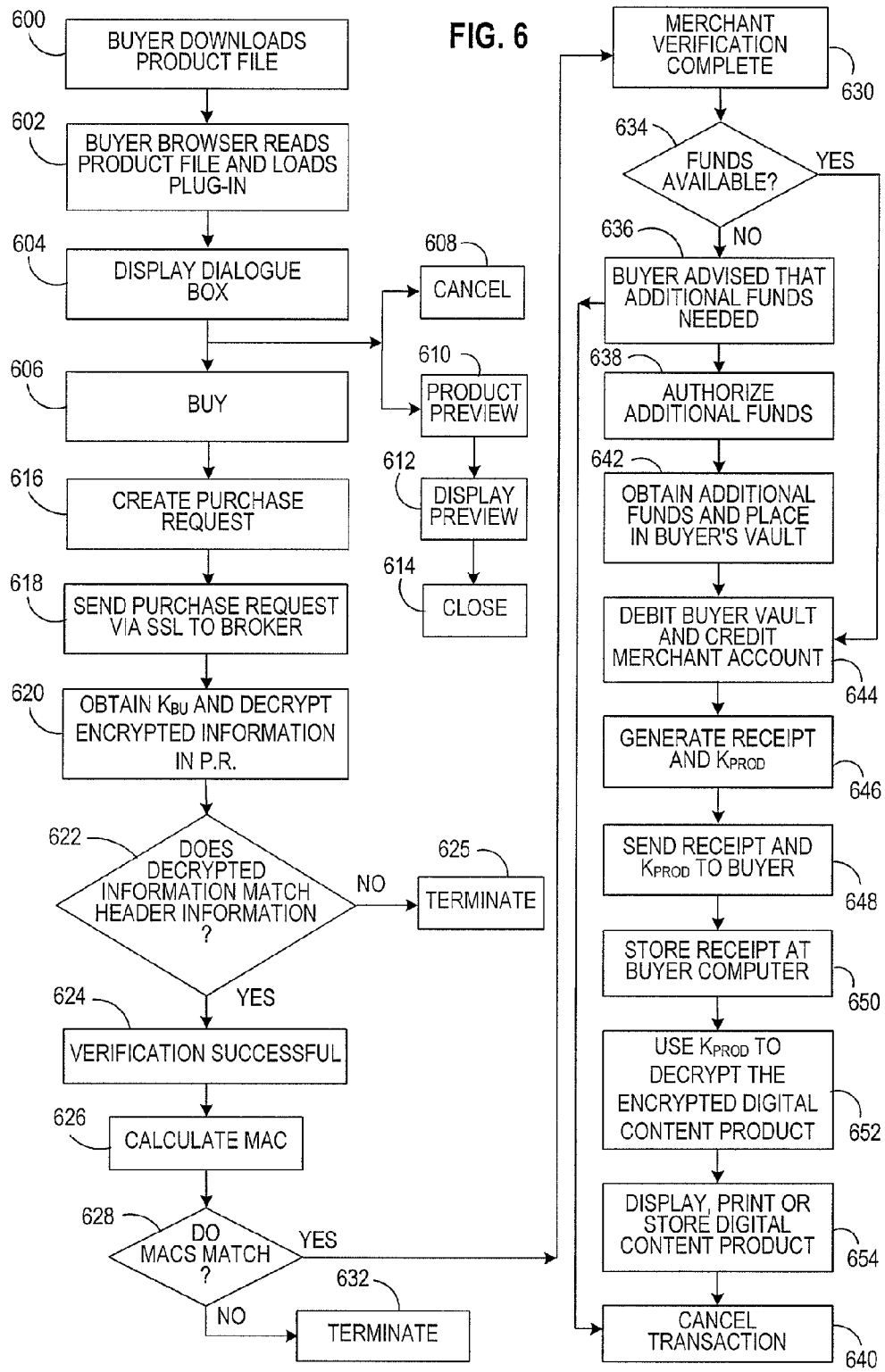

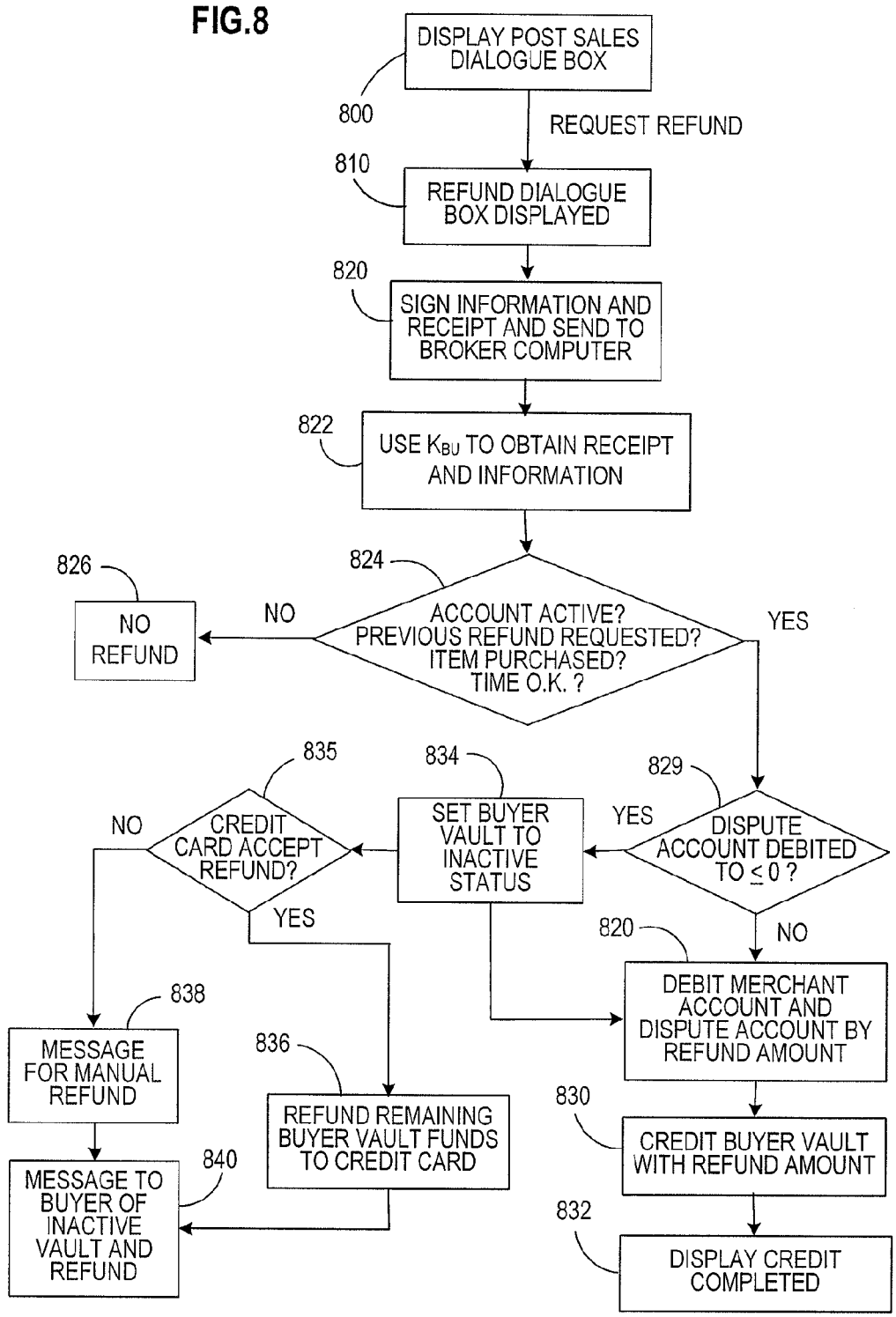

METHOD FOR FACILITATING A TRANSACTION BETWEEN A MERCHANT AND A BUYER

FIELD OF THE INVENTION

The instant invention is directed to online transaction systems and more particularly to the selling and buying of a digital content product online.

BACKGROUND OF THE INVENTION

In today's society with the proliferation of personal computers in the home and the ability to easily connect to the Internet, electronic shopping has become much more common. In the most common scenario, a buyer wishing to procure an item from a merchant visits the merchant's web site. The web site allows the buyer to select the desired item to ascertain its price and to purchase the item if so desired. Once the buyer clicks on an icon designating the intent to buy the item, the buyer is immediately confronted with a screen that needs to be filled in with the personal profile of the buyer. Typically, the buyer is required to provide, as a minimum, their name, address, and a credit card number to which the cost of the purchased item is to be charged. Additionally, the buyer may be asked if they want their personal profile saved so that the data they just entered will not have to be reentered each subsequent time they wish to purchase an item from that same merchant. If the buyer desires the personal information to be saved, they will have to provide a user name and an associated password. The user name and password need to be provided each time the buyer wants to purchase an item from the merchant's web site in order for their personal profile data to be automatically made available.

While the above payment system is currently used, it has a number of serious drawbacks from both a merchant and a buyer perspective. First, it is a single merchant/multiple buyer system. Therefore, each time a buyer wants to purchase a product from a different merchant a complete registration/personal profile data entry must be completed for the specific merchant's system. Since different merchants often require user names and passwords of different character lengths or require specific alphanumeric combinations for such user names and passwords, the buyer is often presented with the situation where multiple user names and passwords must be remembered and correlated with the correct merchant for each purchase. Secondly, where credit card payments are utilized, the buyer still receives a credit card bill so that the online transaction doesn't have the feel of a cash transaction. Thirdly, from a merchant's perspective, in the situation where very low cost items are being sold online, it is not economical to permit these items to be paid for by credit card. That is, credit card companies might charge 20-35 cents and an additional charge of 2-3% of the item value per credit card transaction. Accordingly, the credit card transaction costs associated with low cost items (for example under $5.00) effectively prevent a satisfactory profitable sale of such items in this manner. These low cost purchases are referred to as "micropayments" and most often are associated with the sale of articles or magazines that could easily be sold and delivered online in a digital format if the micropayment profitability problem was overcome.

In addition to the above, other issues confronting electronic payment systems which must be overcome before widespread acceptance by merchants and buyers alike is achieved include:

A] The electronic payment system must operate for most Internet merchant settings. That is, since many small merchants sell goods on web sites hosted by others, they have little or no control over the software that their hosts will provide. Thus, the electronic payment system is most desirable if it does not require any additional software to be resident at the web site host.

B] The system should operate for most Internet buyer configurations so that users who access the Internet through online services and corporate networks protected by firewalls can effectively use the system.

C] Since most buyers are still very concerned about the security and privacy of the personal and financial information they provide electronically, the system must protect the privacy of this information in a manner that builds user confidence.

D] Merchants must feel they are protected from the theft of their products, particularly with respect to digital content sold and delivered over the Internet. Reasonable measures must be taken to ensure that only Internet buyers that have paid for the digital content actually receive the digital content from the seller.

E] The system must manage keys and other security based information for buyers and merchants.

Yet another problem confronting online transactions concerns the efficiency at which digital data is processed. Buyers, in particular, want information presented to them without delay. Accordingly, improvements to online transactions systems are required to more efficiently provide buyers with real time information.

SUMMARY OF THE INVENTION

The instant invention provides an improvement in online transactions by utilizing a method of inputting into the computer a digital content file of the merchant, the digital content file including a header with information related to purchasing a digital content product and the digital content product in encoded form; and the computer reading the downloaded header and displaying at least some of the information related to purchasing the digital content product while concurrently downloading the encoded digital content product into the computer.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a more detailed diagram of the online payment system of FIG. 1;

FIG. 3 is a flowchart for a merchant registration process;

FIG. 4 is a flowchart for a buyer registration process;

FIG. 5 is a flowchart of the process of encoding digital content for sale on a host computer;

FIG. 6 is a flowchart of the operation of the online payment system of FIG. 1;

FIG. 8 is a flowchart of the electronic refund process.

DETAILED DESCRIPTION OF THE PREFERRED EMBODIMENT

Figure 1:
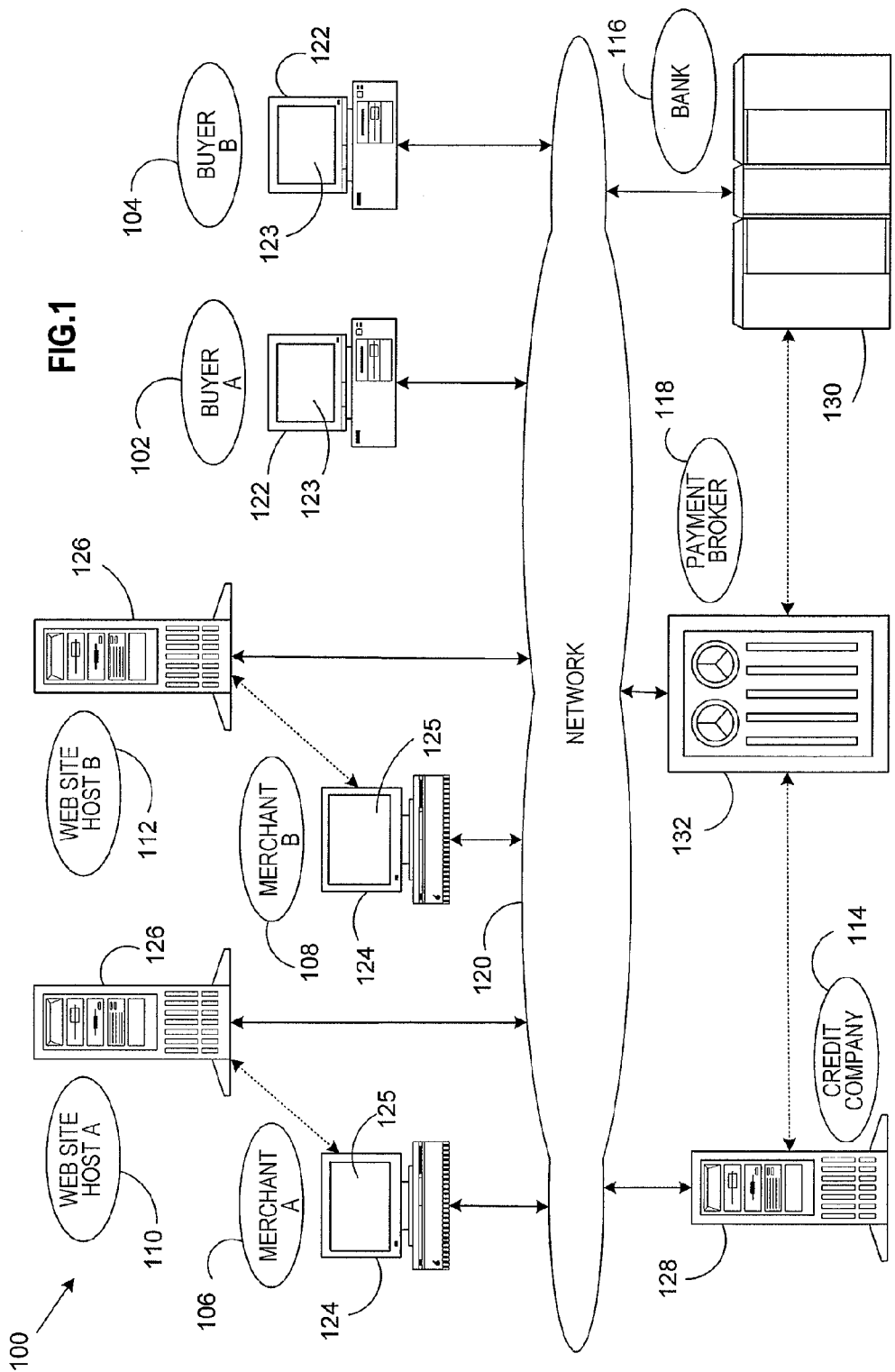
FIG. 1 is a diagram of an online payment system incorporating the instant invention.

FIG. 1 shows an online payment system 100 for conducting online commercial transactions. For general discussion purposes the participants to an online commercial transaction are a plurality of buyers 102, 104, a plurality of merchants 106, 108, a plurality of web site hosts 110, 112 (which can be a third party site or a merchant 106 site), a credit card company 114, a bank 116, and a payment broker 118. While only two merchants 106, 108, and two buyers 102, 104 are shown, it is understood that any number of buyers and merchants can be accommodated by the online payment system 100. Additionally, the payment broker 118 can communicate with a plurality of banks 116 and a plurality of credit card companies 114. Furthermore, while the communications between the participants to an online commercial transaction shall be described as occurring via a public network 120, such as the Internet, the dashed arrows reflect that other known communication channels can be used for the exchange of information between the participants. Moreover, in lieu of the Internet it is envisioned that other current or future forms of communication such as cable television, telephone, and other interactive systems may be used to implement the instant invention.

Each participant 102, 104, 106, 108, 110, 112, 114, 116, and 118 is equipped with a computing system to facilitate online commercial transactions. The buyers 102, 104 have a personal computer 122 including a display 123. The merchants 106, 108 have personal computers 124. The web site hosts 110, 112 have a computer server 126. The credit card company 114 has a server 128. The bank 116 has a minicomputer 130 and the payment broker 118 has a server 132. It is to be understood that the computing units shown in the preferred embodiment are by way of example and not limitation. That is, any participant can use any available computing unit or units that are capable of providing the functionality hereinafter described including minicomputers, PC servers, networked systems, laptops, notebooks, handheld computers, personal digital assistants, cell phones, wrist watches, and the like.

All of the computing units 122, 124, 126, 128, 130, and 132 communicate with each other via the public network 120. The functional relationship between each of the computing units 122, 124, 126, 128, 130, and 132 as described hereinafter permits the supply and purchase of items that can be transmitted as digital content over the public network 120. Such digital content items include, but not limited to, newspaper/magazine articles, pictures, movies, sound recordings, and data such as marketing data, business ratings, mailing lists, templates, etc..

Referring to FIGS. 1-3, the interaction of the merchant computer 124 and the payment broker computer 132 for registration of the merchant 106 with the online payment system 100 will be described. Merchant computer 124 includes a central processing unit (CPU) 140; a ROM (or disk) 142 containing an operating system such as Windows® 95, Windows®, Windows® NT or Windows® CE; a conventional browser 144 enabling interaction with world wide web pages, and a RAM 146 into which the software programs herein described are stored in memory 148 and loaded when launched to execute on the CPU 140 atop the operating system. Merchant computer 124 further includes encoder utility software 150 and a merchant registration file storage 152 that will each be described in more detail hereinafter.

Payment broker computer 132 includes a central processing unit 154, RAM 156, ROM 158, a merchant database 160, a merchant account database 162, decryption software 164, encryption software 166, a buyer database 168, buyer vaults 170, a broker merchant web site 172 and a broker buyer web site 174. When a merchant 106 wants to register with the payment broker's 118 service in order to sell digital content via the online payment system 100, the merchant 106 connects to the broker's merchant web site 172 via the public network 120 utilizing the browser 144 (step 300 ). The merchant 106 indicates the desire to register by clicking on an icon at the broker's merchant web site 172 (step 300). The payment broker computer 132 then requests information from the merchant 106 such as name (of individual or company), mailing and e-mail addresses, work/fax numbers, merchant bank and appropriate account numbers for receiving payments, a merchant password, and the merchant interbank account transfer number (step 302). Upon receipt of the aforementioned information by the broker computer 132, via a secure socket layer (SSL) connection, it is stored in the merchant database 160 (step 304). The broker computer 132 then returns to the merchant computer 124 encoder utility software 150 and a merchant registration file that is stored in merchant registration file store 152 (step 306). The merchant registration file includes a merchant identification (ID) and a merchant secret key "$K_m$" which are also stored in the merchant database 160. The broker computer 132 establishes a merchant account in the merchant account database 162 which is correlated to all of the merchant specific information in merchant database 160, including the merchant registration file information (step 308). At this point in time, the merchant 106 is fully registered with the payment broker computer 132 (step 310).

Referring to FIG. 4, the buyer 102 registers with the online payment system 100 in a similar manner to the registration process of merchant 106. That is, the buyer 102, via the buyer computer 122, browser 176 and the public network 120, connects to the broker buyer web site 174 and clicks on an icon in display 123 to indicate a desire to register as a participant in the online payment system 100 (step 400). The broker computer 132 requests information from the buyer 102 including person's name, company name, mail and e-mail addresses, birth date, gender, occupation, hobbies, at least one credit card number/type/expiration date, buyer password, home/work/facsimile numbers, an indication if automated refills should be accomplished and the amount of such refills (step 402). Buyer computer 122 sends the requested information to the broker computer 132 via a SSL connection (step 404). Upon receipt of the buyer's personal information it is stored in the buyer database 168 and the broker computer 132 establishes a vault for the buyer 102 in the buyer vault database 170 (step 406). The vault is linked to the buyer's personal information as well as the buyer's keys and ID that are discussed below. Subsequently, the broker computer 132 downloads a browser plug-in 178 to the buyer computer 122 (step 408). The plug-in 178 is broker generated software which allows the buyer 102 to communicate with the broker computer 132 and to receive, decrypt, and read a merchant data file 180 which is stored at the merchant web site 181 on the web host server 126. In addition to the plug-in 178, a buyer registration file having a specified MIME that is recognized by the browser 176 is also downloaded to the buyer computer 122 and stored by the plug-in 176 in a certificate store 182 (step 408). The buyer registration file includes, at a minimum, a buyer ID. The plug-in 178 also includes the functionality of deriving a buyer private and public key pair, $K_{BV}$ and $K_{BU}$ (step 410). The public key $K_{BU}$ is sent via the SSL connection to broker computer 132 and stored in the vault database 170 and associated with the buyer's vault (step 412) while the private key $K_{BV}$ is stored in a secure area such as the certificate store 182 of the buyer computer 122 (step 414). At this point in time, the buyer registration process is complete (step 416). It is to be noted that the buyer computer 122 further includes a CPU 184, a RAM 186, a ROM (or disk) 188 and additional memory 190 which operate in a conventional manner, as described in connection with similar components in merchant computer 124, to effectuate the functionality described herein.

A description of the operation of the online payment system 100 will now be described with reference to FIGS. 1-2 and 5-6. At step 500 a registered merchant 106 decides to place an item of digital content (article, music, picture, movie, other data) for sale utilizing the online payment system 100. The merchant 106 uses the encoder utility software 150 provided by the payment broker 118 to encrypt the digital content of the item for sale by first calculating a unique product key "$K_{prod}$" for the item (step 502). $K_{prod}$ is derived by using the encoder utility software 150 to create a secure one way hash of data known to the merchant such as a product ID, the merchant secret key "$K_m$", and a randomly generated number. $K_{prod}$ is then used by the encoder utility software 150 to encrypt the digital content of the item using a known encryption algorithm (step 504). Once the item has been encoded, the encoder utility software 150 creates the file 180 to include a length identifier 200, a signed header 202, a product preview 204, and the digitally encoded content 206 (step 506). The length 200 is used to identify the length of the header 202 portion of the file 180. The significance of this field is that it allows the plug-in 178 to know how much information needs to be read in order to display the header 202 while concurrently downloading the data for the product preview 204 and the encrypted digital content 206. Alternatively, the file length 200 can be used by the plug-in 178 to only download the header 202 and present that information (required to complete the sale) on display 123. The remainder of file 180 (product preview 204 and encrypted digital content 206) are respectively downloaded only if the buyer chooses to view the product preview 204 or buy the digital content item. Accordingly, second and third file lengths can be included as part of the digital file 180 to respectively identify to the plug-in 178 the respective lengths of the product preview 204 and the digital encrypted file 206. These file lengths allow the product preview data 204 to be downloaded and displayed upon request by the buyer without requiring the encrypted digital content file 206 to be downloaded until a buy decision is made by the buyer. Thus, using the file lengths to delay the downloading of various portions of file 180 greatly improves network performance since selective portions of the file 180 are only downloaded upon command.

The file 180 has a name which includes a first MIME type that the browser 176 recognizes to activate the plug-in 178. Additionally, the header 202 includes a second MIME which identifies the file type of the digital content being sold. This second MIME allows the plug-in 178 to identify to the browser 176 the digital content file type so that browser 176 can render (i.e. display, play, save, print) the decrypted digital content as described in more detail below. Furthermore, the header 202 may include a third MIME which is used by the plug-in 178 to identify to the browser 176 the file type of the product preview 204 to enable the browser to activate the product preview 204. The header 202 also includes unencrypted data including the product ID, the random number associated with the item in producing Kprod, the merchant ID, the price and any other relevant data the merchant 106 chooses to include. Additionally, the header 202 includes a Message Authentication Code (MAC) created by the encoder utility software 150 based at least in part on the merchant key "$K_m$" and other data in the header 202 such as the product ID. The complete file 180 is then posted by the merchant 106 at their web site 181 in any conventional manner such as by e-mail, FTP, browser transfer, file copies, or Microsoft's Web Publishing Wizard (step 508). The other data that may be included in the header 202 includes product name, type currency for price, product description, merchant name, rating of file content, rating system, date of encoding, product version #, expiration date of file, MIME type of preview 204, and URL (or email address) for notification of sale. It should be noted that while the length 200 and product preview 204 are shown separately from the header 202, they could be included as part of the header 202.

Figure 7:
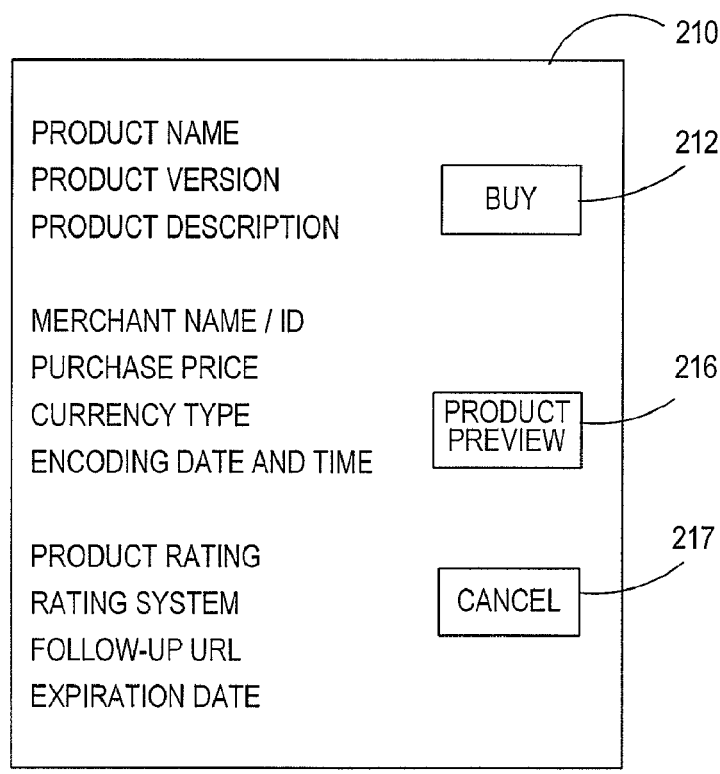
FIG. 7 is a diagram of a dialogue box.

Referring specifically to FIG. 6, buyer 102 visits the merchant web site 181 and downloads, via the browser 176, the file 180 associated with the item of interest to the buyer 102 (step 600). The browser 176 reads the header 202, recognizes the file MIME type, and loads the plug-in 178 (step 602). The plug-in 178 displays on the display 123 selected header information in a dialogue box 210 shown in FIG. 7 (step 604). The buyer 102 has the option of 1) purchasing the item based on the descriptive information contained in the dialogue box 210 by clicking the buy icon 212 (step 606), 2) aborting the transaction by clicking the cancel icon 214 (step 608), or 3) previewing the product preview 206 which is a copy of a selected unencrypted portion of the digitally encoded content 206 prior to making a buy decision by clicking the product preview icon 216 (step 610). It is important to note that by clicking the product preview icon 216 the plug-in 178 provides the browser 176 with an actual copied portion of the unencrypted digital content which is displayed in a separate window. The browser 176, based on the preview MIME type, then obtains any necessary plug-ins required to display the product preview to the buyer 102 on the display 123 (step 612). Since the product preview is 1) embedded in the file 180, 2) is a copy of an actual unencrypted portion of the encoded digital content 206 and 3) is not obtained from a separate link, the merchant 106 can easily ensure that the product preview provided is part of the actual digital content to be purchased. That is, if the product preview was obtained not from within the file 180 but from a separate link, there is always the problem of ensuring that the product preview content is actually part of the digital content being purchased since any changes in the digital content requires a change of the file as well as the product preview content at the link site. In the instant embodiment, only the file 180 needs to be changed in order to make the product preview 204 and the digital content 206 consistent with each other. Additionally, the product preview 204 allows the buyer to ascertain prior to purchase, if the item can be read/displayed by the buyer computer system 122. That is, if the buyer computer 122 doesn't have the software/plug-ins required to read and/or display the product preview 204 the buyer 102 can cancel the transaction by closing the preview (step 614) and clicking on the cancel icon 214.

Once the buyer decides to purchase the digital content 206 of the downloaded file 180, the plug-in 178 generates a purchase request that is sent to the broker server 132. The purchase request is created by the plug-in 178 by digitally signing information contained in the header 202 such as the product ID and the price together with the buyer ID and signing this information with the private key $K_{BV}$ of the buyer 102 (step 616). In addition to the purchase request, the header 202 information of file 180 is also sent to the broker server 132. The purchase request and header 202 are sent to the broker computer 132 via a SSL (step 618). The broker computer 132 obtains the public key $K_{BU}$ of the buyer from the buyer vault 170 and uses it to verify the signed header information in the purchase request using the same algorithm stored in the decryption unit 164 that the plug-in 178 used to sign the information (step 630). A comparison of the decrypted information is made with the header 202 information included in the purchase request (step 622). If the decrypted header information matches the corresponding header 202 information sent as part of the purchase request, verification of the buyer's purchase request has successfully occurred (step 624). If there is not a match, the transaction is terminated (step 625). Assuming verification is successful, the broker computer 132 then calculates a MAC in the same manner that the merchant 106 calculated the MAC contained in the header 202 using the merchant specific data residing in the merchant data base 160 (merchant key Km obtained by correlation to merchant ID in purchase request) together with the other information needed to calculate the MAC and contained in the header 202 (step 626). If the broker calculated MAC matches the MAC in the header (step 628), verification that the header 202 information is actually that of the merchant 106 occurs (step 630). Thus, if an unscrupulous buyer attempted to change, for example, the price in the header 202, a MAC match would not occur and the transaction would be terminated (step 632). Therefore, a reliable price check mechanism is incorporated in the online payment system 100.

Once the above purchase request and MAC verifications occur, the broker computer 132 checks to determine if the buyer's account in vault database 170 has sufficient funds to pay for the item to be purchased (step 634). If the answer is "NO" the buyer will be prompted via a dialogue box to provide additional money for their account (step 636). The buyer 102 can then authorize the broker computer 132 to obtain additional funds authorization from the credit company 114 (step 638) or cancel the transaction (step 640). If authorization for additional funds is selected by the buyer, the broker computer 132 electronically communicates with the credit company server 128. Once the additional funds are received and placed in the buyer's vault 170 (or if the answer at step 634 is YES), the broker computer 132 debits the buyer's vault 170 for the price of the item to be purchased and credits this amount to the merchant's account 162 (step 644). The broker computer 132 then generates a receipt which is signed using the private key "$K_{broker}$" of the broker 118 and also generates the product key "$K_{prod}$" based on the header 202 information and the merchant 106 related information stored in the merchant database 160 (step 646). The receipt and product key "$K_{prod}$" are sent to the buyer computer 122 (step 648). The receipt is stored in memory 190 as proof of payment (step 649). The product key "$K_{prod}$" is used by the plug-in buyer 178 decrypt the encrypted digital content 206 of the file 180 (step 652). The decrypted digital content 206 is sent to the browser buyer 176 for subsequent display, printing, or storage by the computer 122 (step 654). Subsequent to this activity the broker computer 132 sends funds equivalent to the total amount stored in the merchant's account 162 on a regular basis (such as nightly) to the designated merchant's account at the merchant's bank 130 and resets the merchant's account 162 to zero.

Subsequent to the download of the receipt and the product key by the by the buyer computer 122, the plug-in 178 via the browser 176 displays a post sales dialogue box on display 123 (step 800). The post sales dialogue box queries the user as to whether 1) they wish a refund, 2) they wish to take a survey (with an offer to be reimbursed for their time), and 3) the transaction is complete. If the buyer selects a request for refund, a new dialogue box appears prompting the user to select from among a predetermined number of reasons as to why they desire a refund or to enter their own reason (step 810). This information along with the receipt for the item is signed with the private key of the buyer $K_{BV}$ and sent to the broker computer 132 (step 820). The broker computer 132 utilizes the buyer's public key $K_{BU}$ to obtain the refund information and the receipt (step 822) and checks to ensure that 1) the buyer's account is active, 2) the refund request is for a previously purchased item and 3) a refund has not previously been made for that item (step 824). Additionally, the broker computer 132 ensures that any preset period of time associated with how long after purchase a request for refund can be made has not been exceeded (step 824). If any of the above checks fail the buyer 102 is advised that a refund will not be given (step 826). On the other hand, if the checks are all positive, the broker computer 132 debits the refund amount from a dispute account associated with the buyer 102. That is, for each buyer, in addition to their vault 170 there is a dispute account established at the broker computer 132. The dispute account has a threshold value associated with it that is debited each time a refund is given to a buyer. Thus, for a given refund the dispute account and the merchants account 162 for the merchant 106 selling the particular item are debited by the refund amount (step 828). The money debited from the merchant's account is transferred to the buyer's vault 170 (step 830) and the buyer receives a message on display 123 that the vault has been credited (step 832). However, if the dispute account is decremented to zero or a negative (step 829), a flag associated with the buyer's vault 170 is set from an active status to an inactive status (step 834). At this point in time it is determined if the credit card accepts refunds (step 835), and if it does, any monies in the buyer's vault 170 are refunded to the buyer's default credit card (step 836). If the default credit card does not accept a refund, a message is sent to a general logging device so that a manual refund can be issued (step 838). The buyer 102 then receives a message indicating that their vault is inactive and their remaining money will be credited to the default credit card or returned manually as the case may be (step 840). It is also possible to establish a time limit associated with the threshold value of the dispute account. That is, if the threshold value is not exceeded over a specified period of time, the dispute account is reset an initial value. Moreover, an additional counter can be added at the broker computer 132 for each buyer 102 that keeps track of the number of times a refund has been requested. If the number of requests exceeds a predetermined number, the buyer's vault is rendered inactive. Additionally, while the above described embodiment described the refund account as a descending register which starts at the threshold value and is debited down to zero, one skilled in the art will recognize that the refund account could be an ascending register which adds the refund amounts and inactivates the buyer's vault 170 when the predetermined threshold value is met.

Other features which can be included in the inventive system include tracking the period between disputes or the ratio of actual purchases to disputes and basing either the rendering of the dispute account inactive or readjusting the value in the dispute account on such tracked parameters. Furthermore, the threshold value in the dispute account can be automatically increased based on the amount or number of purchases made by the buyer. This would allow a low threshold for initial set-up of a dispute account but allow the buyer the right to earn additional value to be added to the dispute account based on their buying history.

In addition to the above, the broker computer 132 maintains a transaction log of all buyer and merchant transactions which are viewable by the respective parties via the corresponding web sites 174 and 172. Thus, buyers and merchants have ready access to the status of all activities associated with their accounts. In yet another embodiment the buyers can request a refund on a previously purchased item directly based on the transaction log. Thus, even if a buyer initially (at the time of purchase) does not request a refund, they can request it at a later date (can be limited timeframe).

Furthermore, the broker computer 132 can take a buyer designated request to calculate the actual cost of the item taking into account appropriate taxes and exchange rates. Thus, the broker computer 132 is ubiquitous in that it can accommodate various tax and currency situations and provide the user with an actual cost in their own currency.

In the above described embodiment the encoded digital content 206 is placed on the web site 181 in encoded form (static encoding). A benefit of static encoding is that no software is required at the host web site 181. Thus, static encoding is good for items that will have no content change such as previously written articles or musical recordings. However, if the item for sale is constantly changing data, such as stock information, the static encoding method is not efficient. In this situation, the encryption utility software 150 would be placed at the host web site 126 and the digital content to be purchased would be encrypted dynamically prior to each download of a file 180 to a buyer 102. Thus, for each buyer request for a digital content item a new product key $K_{prod}$ is generated. This provides increased security since if $K_{prod}$ is compromised for a single download of a file 180, only that specifically downloaded file 180 is compromised. In the static situation where there is a single $K_{prod}$ associated with a file 180, if $K_{prod}$ is compromised any download of the file 180 is potentially compromised. The disadvantage of the dynamic encoding model as compared to static encoding is that it creates a greater burden on the host server 126. The instant invention recognizes the advantages of static and dynamic encoding and in one embodiment contemplates a web site host 126 that has statically encoded digital content which is of a low value and a stable nature and also provides dynamic encoding of rapidly changing digital content and/or high value digital content items. Since the ultimate file structure 180 resulting from either the dynamic or static encoding is the same, the plug-in 178 can effectively perform its designed functions in either situation.

Another aspect of the instant invention relates to the efficiency in operation of the online payment system 100. The plug-in 178 is designed to read the length 200 associated with the header 202 and preview portions 204 of the file 180 so that it knows when the download of those portions of the file 180 have been completed or need to be started. The plug-in 178 permits the interface and exchange of information between the buyer computer 122 and the broker computer 132 as discussed in connection with FIGS. 1-2 and 6-7 once the header 202 and preview 204 have been downloaded without waiting for the encrypted digital portion 206 to be completely downloaded. Thus, the product preview and/or purchase of the item via the interaction of the buyer computer 122 and the broker computer 132 occurs concurrently with the downloading of the encrypted digital content portion 206 of file 180. Furthermore, if the encrypted digital content 206 has not been downloaded prior to receipt by the buyer computer 122 of the receipt and the product key $K_{prod}$ from the broker computer 132, the plug-in 178 connects to the web site 126 to request the download of the encrypted digital content 206 and begins decrypting the encrypted digital content 206 as it is being downloaded while concurrently providing the decrypted digital content to the browser 176 for display. These dynamic and concurrent processes provide the buyer 102 with the purchased item in a very timely manner. As previously noted in another embodiment the use of various file lengths can delay the downloading of various portions of the file 180 until requested by the buyer.

In yet another embodiment of the invention it is desirable to ascertain at the time a purchase request is received by the broker computer, if the buyer 102 had previously purchased the digital content item. The broker computer 132 can search the particular buyer's transaction logs to determine if a previous purchase has occurred. If the item was previously purchased, the broker computer 132 will automatically send the product key $K_{prod}$ to the buyer computer without charging the buyer's vault 170 for a purchase.

An additional feature that may be included as part of the online payment system is that the merchant 106 can include in the header 202 an indication that the merchant 106 wishes to be notified in real time of all sales that have been completed via the online payment system 100. The notification requirement is passed by the plug-in 178 as part of the purchase request to the broker server 132. The broker server 132, upon completion of the sales transaction, sends the details associated therewith to the merchant 106 by posting it to a merchant designated URL or sending it to a merchant provided email address. The URL or email addresses can be included as part of the header 202 or can be predesignated in the merchant data base 160.

The online payment system 100 can be provided with further functionality by permitting the merchant 106 to specify in the header 202 multiple prices/rates (e.g., an individual rate and a corporate rate). The plug-in 178 would present to the buyer 102 on display 123 the option of selecting from an individual rate or a corporate rate. If the corporate rate option were selected, the buyer 102 is provided with the details of various corporate rates that are based on the number of copies of the procured item the corporation desires to distribute within their corporation (e.g. 50, 100, unlimited). The buyer 102 then selects the desired rate and the payment process continues in the manner previously discussed. This feature overcomes the dilemma faced by many corporations who obtain an article of interest and then wish to circulate copies throughout the organization. Because of the copyright laws, the corporation needs to obtain the right to make and distribute such copies. The rights can be obtained by signing up with a clearing house or contacting the owner of the copyright directly. The instant invention provides a real time capability for corporations to easily obtain rights for the distribution of multiple copies of an item on an item by item basis.

An alternative method of providing the multiple copy/distribution corporate rate structure is to designate, in the buyer database 168, a designated rate for multiple copies (i.e. 50) that is automatically invoked any time the particular buyer 102 purchases an item. In this situation the buyer 102 would be charged a cost associated with the initial cost of the item as well as the premium charged for the right to make/distribute the designated multiple copies. This feature also permits the customizing of discounts to individual corporations.

Another service that the online payment system can provide is to not charge a corporate client multiple times for content which has been purchased at a corporate rate. When a corporate buyer designates a desire to purchase the digital content, the broker computer 132 would search the transaction logs associated with the corporate buyer 102 to ascertain if anyone else in the corporation had previously purchased the content. If the content had been purchased by someone else at the corporate rate, the product key $K_{prod}$ would be provided free of charge since the corporation had previously paid for multiple copies. Additionally, in the event that individuals of a corporation independently purchased content based on an individual rate, the broker computer 132 based on the historical logs, could determine for an individual piece of content if all of the individual purchases of the content should be lumped together as one corporate purchase. For example, if an individual purchase of digital content was fifty cents and a corporate rate for 15 copies of the digital content was five dollars, once ten individual purchases were made, the broker computer 132 would not charge for the next 5 individual purchases made by that corporation.

While the above described system shows the encoded files at the host web site, it will be apparent to those possessing ordinary skill in the art that the encoded files could be placed on a CD. Thus, a merchant can provide a catalogue of products that can be purchased. The buyer computer 122 would permit the buyer 102 to select the desired item (file) and then the plug-in 178 would operate in the same way as described above to effectuate a purchase of the item via communication with the broker computer 132. Additionally, the file structure of the claimed invention permits files to be sent by email so that a purchase can be made by accessing the file received by email.

In the above embodiments the merchant 106 encoded the digital content item for sale. However, in an alternative embodiment the payment broker server can perform this function. That is, merchant 106, via merchant computer 124 communicates with the broker's web site 172 to schedule automated encoding by the broker computer 132 of the digital content in directories at the merchant web site 181. They may specify, for example, up to 100 directories to be automatically encoded. For each directory, the following information is provided by the merchant 106:

Whether the directory is accessible via HTTP, FTP, or ODBC.
For HTTP, whether access should be via HTTPS.
For ODBC, whether access should be via a secure tunneling protocol and the associated data required for such access.
For ODBC, the database name, the table name, and the field name.
The username and password to access the directory, if any.
The name of a file which will reside in the directory with the names of the files to be encoded, the files external name, and a short description of each file.
The name of a file that describes other encoding attributes such as price rating, offers to buy personal information. The scheduling system applies these globally to all files in a given directory.
The interval at which the directory should be inspected.
Where the files should be stored.
How the files should be stored there (FTP, Microsoft Web Publishing interface, ODBC)
The username and password for accessing the storage directory.
For ODBC storage, whether access should be via a tunneling protocol.
For ODBC storage, the database name, the table name and the field inside the table.
An email address to receive notification of encoding.

When the broker system 132 receives a request for the automated encoding, it will schedule automatic encoding and encryption of the specified directory or directories by directly interfacing with the merchants' web site 181. The merchant 106 shall get an email from the broker computer 132 every time files are encoded and stored on the web site 181. The email shall detail the process including byte counts and success or failure. It will also include any charges that resulted to the merchant's account 162 because this service was used.

Additional advantages and modifications will readily occur to those skilled in the art. Therefore, the invention in its broader aspects is not limited to the specific details and representative devices, shown and described herein. Accordingly, various modifications may be made without departing from the spirit or scope of the general inventive concept as defined by the appended claims. For example, while the preferred embodiment described above discussed the sale and purchase of digital content items, the inventive system can be modified for the purchase of hard goods or services. In this scenario, the digitally encoded content is not required as part of file 180. When buyer computer 122 requests a purchase of the hardware item, the same accounting and verification takes place at broker computer 132. However, instead of a product key being sent to buyer computer 122, only a receipt for the purchased item is sent. The last computer also sends to the merchant a notification of the purchase as well as shipping instructions provided by the buyer as part of the purchase order.

Additionally, while the preferred embodiment described the system as being a prepaid account in buyer vault 170, the vault 170 could be a post purchase vault. In this configuration the vault 170 does not have actual value but accounts for purchases made. The buyer would then be billed separately. Of course, the arrears vault 170 could be set to a maximum threshold in order to put a cap on the amount of charges that can be obtained.

Furthermore, while the dispute account was described as residing at the payment broker site 132, it could also be maintained in the buyer computer 122. In this configuration, a buyer could accumulate refund requests off line from the broker server 132 and have their vault account reconciled at the next communication with the broker server 132. The dispute account threshold values and operation relative thereto would operate in the same manner as at the broker server 132 and would utilize transaction data maintained at the buyer computer 122.

Finally, the refund process of FIG. 8 can be modified such that prior to step 829 a check is made to ascertain if the buyer's dispute account has sufficient funds to cover the refund request. If the answer is NO, the process moves to step 826. On the other hand if the answer is YES, the process moves to step 829. Of course, since the debit account can never go to less than zero, step 829 queries whether the dispute account is debited to zero or another predetermined number within a positive range of zero.

What is claimed is:

1. A method for using a computer by a broker to encrypt digital content product files of a merchant that are hosted at a merchant web site, the method comprising the steps of:
   inputting into the computer an identification of the digital content product files designated for encryption together with the web site location of the digital content product files and information required to access the digital content product files;
   via the computer, connecting to the web site and accessing and encrypting the digital content product files designated for encryption; and
   storing the encrypted digital content product files at the web site.

2. A method as recited in claim 1, further comprising inputting into the computer a location at the web site where each of the encrypted digital content product files are to be stored, and storing the encrypted digital content product files at the location.

3. A method as recited in claim 2, further comprising using the computer to create a buyer product file for each encrypted digital content product file, the buyer product file including the encrypted digital content product file and a header having information about the digital content product file for use by a buyer in making a decision on whether to purchase the digital content product.

4. A method for distributing from a first computer digital content products for purchase, the method comprising the steps of:

encrypting a first digital content product file;

statically storing the encrypted first digital content product file at the first computer;

storing a second digital content product file in unencrypted form at the first computer; and inputting a request into the first computer for downloading from the first computer to a second computer at least one of the encrypted first digital content product file and the second digital content product file;

wherein at times when the request is for the encrypted first digital content product file downloading the encrypted first digital content file to the second computer, and at times when the request is for the second digital content product file dynamically encrypting the second digital content product file and sending the second digital content product file in encrypted form to the second computer while maintaining the storing of the second digital content product file in unencrypted form at the first computer.

\* \* \* \* \*